(12) United States Patent
Belanger et al.

(10) Patent No.: US 7,302,894 B2
(45) Date of Patent: Dec. 4, 2007

(54) CURVED ENTRY GUIDE RAILS FOR CAR WASH CONVEYOR

(75) Inventors: Michael J. Belanger, Novi, MI (US); Barry S. Turner, Novi, MI (US)

(73) Assignee: Belanger, Inc., Northville, MI (US)

( * ) Notice: Subject to any disclaimer, the term of this patent is extended or adjusted under 35 U.S.C. 154(b) by 322 days.

(21) Appl. No.: 11/094,984

(22) Filed: Mar. 31, 2005

(65) Prior Publication Data

US 2006/0225601 A1 Oct. 12, 2006

(51) Int. Cl.
*B08B 3/00* (2006.01)

(52) U.S. Cl. .................. 104/242; 104/162; 104/172.3; 134/123

(58) Field of Classification Search ............. 104/172.3, 104/162, 242; 15/53.4; 134/123, 45; 428/99
See application file for complete search history.

(56) References Cited

U.S. PATENT DOCUMENTS

| | | | |
|---|---|---|---|
| 3,724,390 A | 4/1973 | Beer et al. | |
| RE30,026 E * | 6/1979 | Hanna et al. | 104/172.3 |
| 4,690,065 A * | 9/1987 | Belanger et al. | 104/172.3 |
| 4,981,151 A | 1/1991 | Larson et al. | |
| 5,027,714 A | 7/1991 | England | |
| 5,432,974 A | 7/1995 | Yasutake et al. | |
| 5,730,061 A | 3/1998 | Stufflebeam | |
| 6,422,153 B1 | 7/2002 | Reitsch, Jr. | |

* cited by examiner

*Primary Examiner*—Mark T. Le
(74) *Attorney, Agent, or Firm*—Young Basile

(57) ABSTRACT

A vehicle tire entry guide for transitioning vehicles into a car wash lane comprises a pair of smoothly-curved, reversely similar tire guide rails covered with plastic. Each curved guide rail comprises a curved angle iron with stanchions which can be bolted to the car wash floor and an extruded polyethylene cover which eliminates the need for moving parts and smoothly transitions into a conveyor tire guide lane. A roller grid or the like may be floor-mounted between the curved guide rails.

7 Claims, 5 Drawing Sheets

CURVED ENTRY GUIDE RAILS FOR CAR WASH CONVEYOR

FIELD OF THE INVENTION

This invention relates to car wash apparatus and more particularly to a vehicle conveyor tire entry guide characterized by reversely similar, smoothly curved, tire entry rails.

BACKGROUND

Most tunnel-type automatic car washes employ a conveyor with parallel rails to guide the left-side tires of the car through the various stations of the car wash. Because cars often approach the guide rails off line to some degree, it is common to install two converging guide bars, usually with rollers, immediately in front of the conveyor guide rails to direct the left front tire into the lane between the guide rails. The converging guide bars are straight and intersect the conveyor guide rails at an angle.

SUMMARY

The present invention represents an improvement over the straight converging tire guide bars described above which improvement eliminates the angled intersection between the entry bars and the conveyor rails. In accordance with the present invention, smoothly and reversely curved guide rails are located in front of and contiguous with conveyor guide rails to define a gradually and smoothly narrowing tire guide path into a conveyor lane. In the preferred embodiment hereinafter described in detail, the converging guide rails have no rollers or other moving parts. Instead, such rails are constructed of simple curved angle irons covered with smooth plastic extrusions made, for example, of high or medium density polyethylene to reduce the friction between a tire and the guide rail. A guide rail system of the present invention may be used with devices such as floor-mounted roller grids to facilitate lateral movement of the vehicle to properly enter the conveyor lane.

In the preferred form, each of the subject entry tire guide rails comprises a curved angle iron with floor mount brackets and an extruded polyethylene cover having a cross-section configuration which smoothly and conformingly mates with the angle iron rail. The entry rail is preferably provided with smoothly curved 90° end pieces which can also be bolted to the floor of the car wash.

The term "car" is used herein to include all types of vehicles, including SUV's, trucks, busses and railway cars.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2A is an end view in section of one of the guide rails from FIG. 2;

DETAILED DESCRIPTION OF THE ILLUSTRATIVE EMBODIMENT

Figure 1:
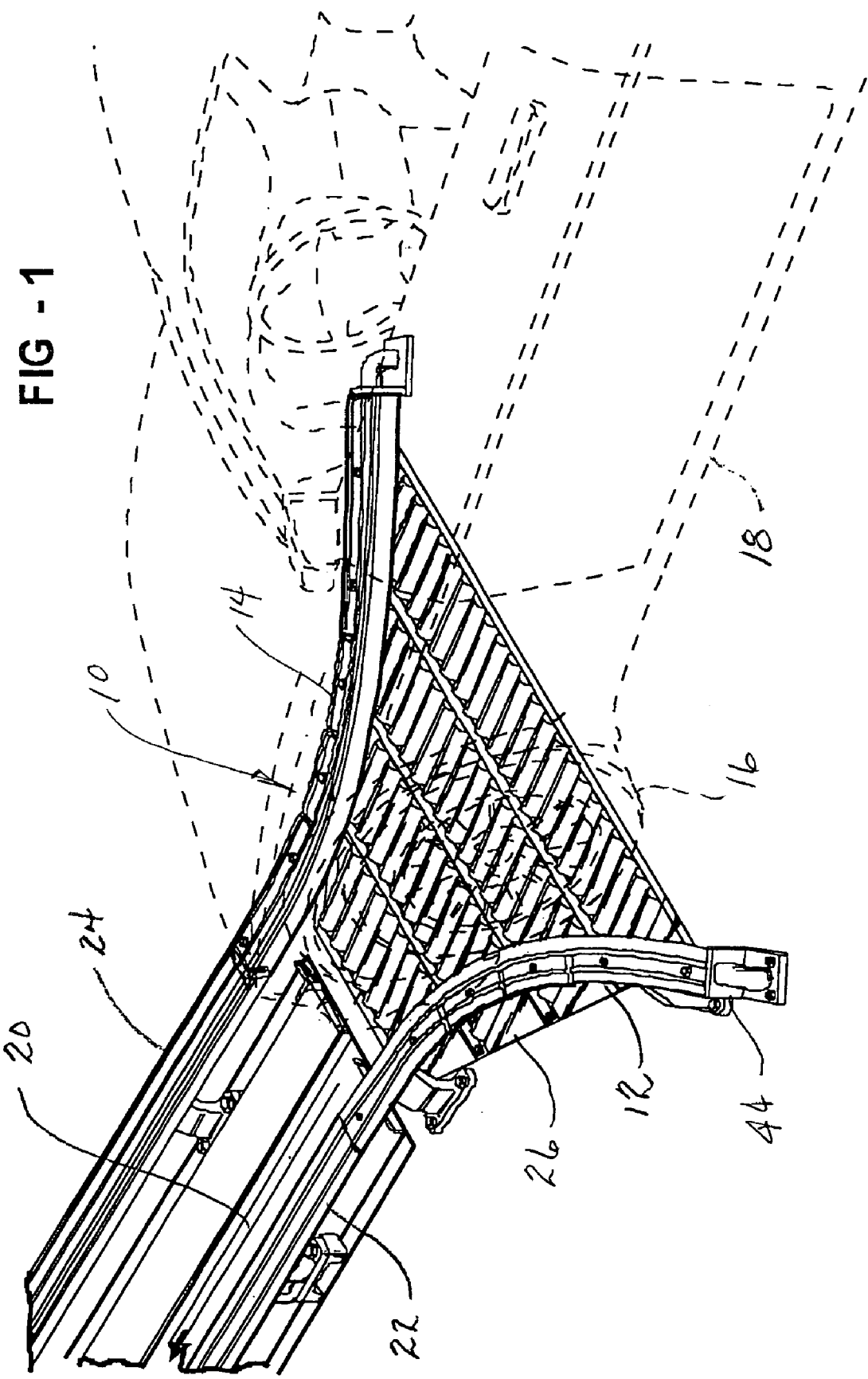
FIG. 1 is a perspective view of a portion of a car wash conveyor installation in accordance with the invention, with a vehicle shown in phantom.

Referring to the drawings, in particular to FIG. 1, there is shown an entry guide installation 10 for car wash conveyor, including a smoothly-curved, left-side entry guide 12 and a reversely smoothly-curved right-side entry rail 14. The rails 12 and 14 are mounted to the floor of a car wash for the purpose of guiding the left-side tire 16 of a vehicle 18 into a conveyor tire-guide lane 20 between straight parallel guide rails 20 and 24. The entry guide rails 12 and 14 operate in conjunction with a roller grid 26 which is mounted in the conveyor floor to permit a misaligned vehicle to be shifted laterally so that tire 16 properly enters the conveyor guide lane 20.

Referring to the additional figures, the left-side guide rail 12 is shown to comprise a steel angle iron 28 attached such as by welding to a series of stanchions 30 having base brackets 32 which are adapted to be bolted into a floor structure by means of bolts 34. The angle iron 28 is covered with a polyethylene extrusion 36 having a reversely curved bottom section 38 which fits under and around the vertical portion of the angle iron 28. The extrusion 36 overlies the horizontal portion of the angle iron 14 and is secured in place by a series of bolts 40. The extrusion 36 is preferably slotted or notched at spaced location 42 to permit the otherwise straight extrusion to be bent to assume the curvature of the underlying angle iron rail 28.

Figure 2:
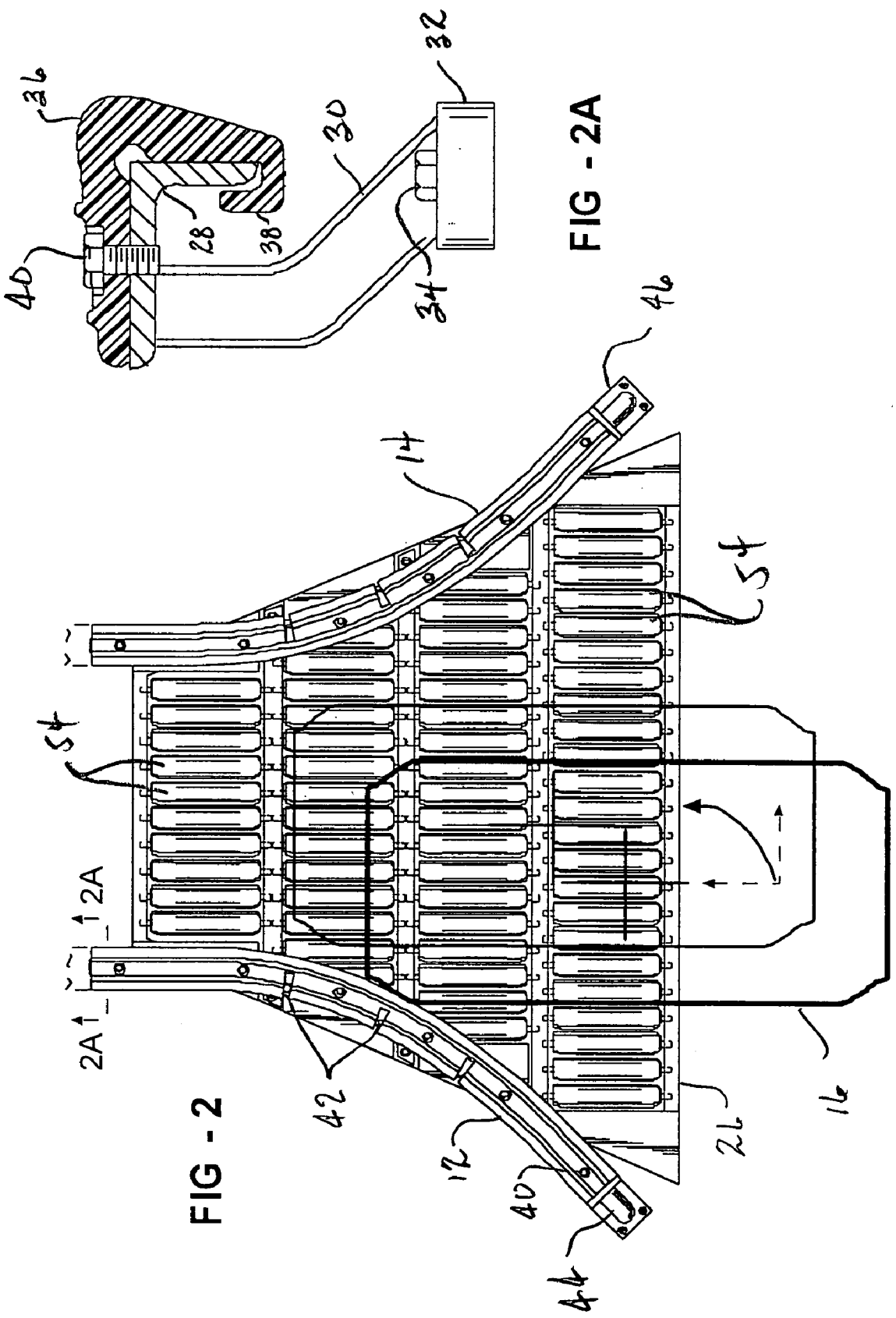
FIG. 2 is a plan view of the entry rails overlying a roller grid to facilitate lateral vehicle movement.
Figure 3:
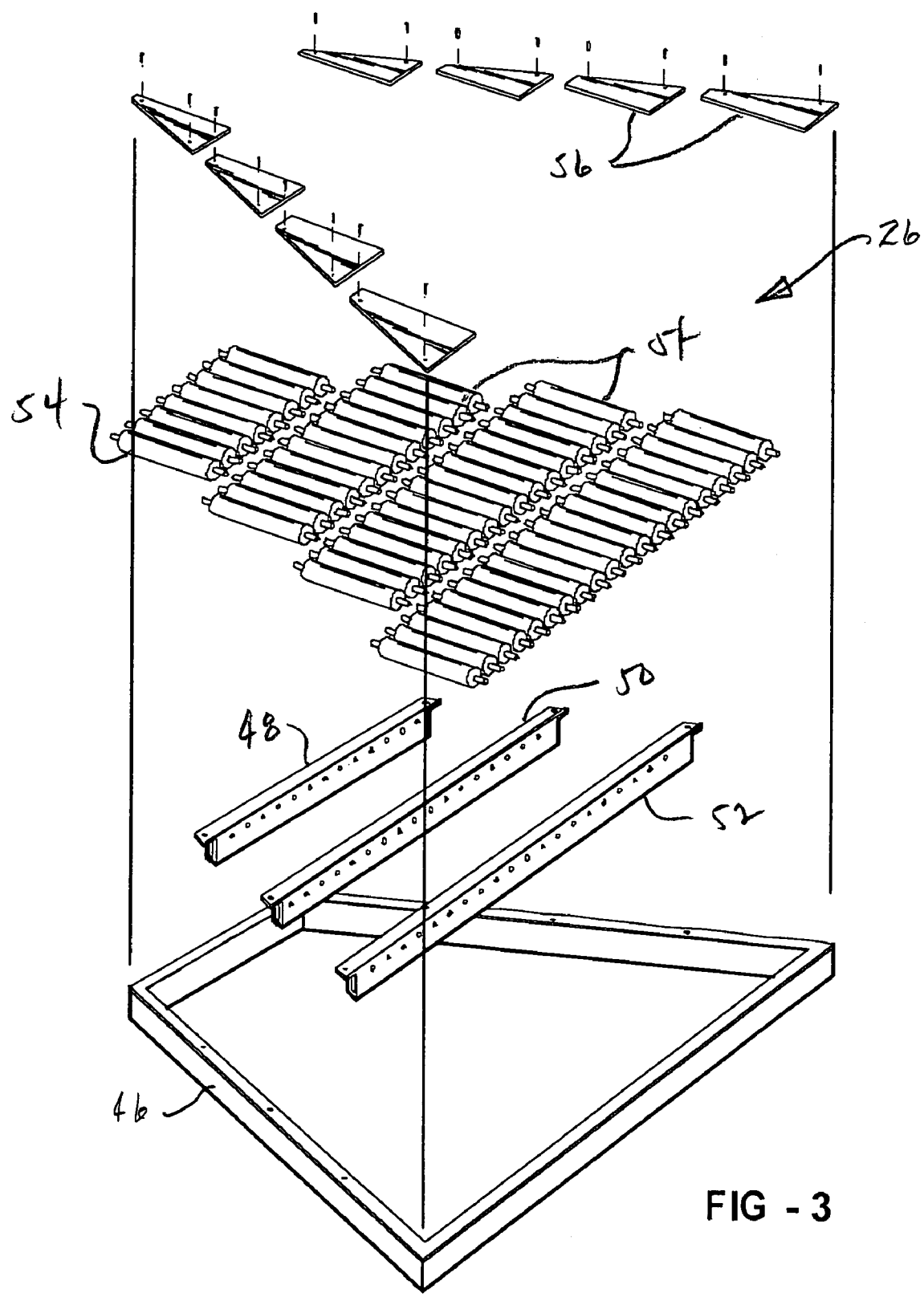
FIG. 3 is an exploded perspective view of a roller grid.

The right-side rail 14 as shown in FIG. 2 is, except for the height of stanchion 30, reversely similar and structurally identical to the left-side rail and is not further described in detail. The left-side rail 12 is preferably mounted so as to be approximately 5 inches from the underlying floor, whereas the right-side rail is approximately 4 inches in height. This assumes that the guide rails 12 and 14 are mounted on the left, or driver's side of the vehicle, in accordance with customary American vehicle design.

Adaptors 44 and 46 are mounted contiguous to the ends of the rails 12 and 14 and are characterized by 90° semi-cylindrical sections of smoothly-rounded, exterior surface to prevent tire damage in the event of an off-line vehicle entering the space between the entry rails 12 and 14.

In actual practice the rails 12 and 14 are preferably made up of opposite end sections which are essentially straight and a center section which is curved and smoothly joins the end sections. Alternatively, a constant or relatively constant radius design may be employed. In either case, the entry rails 12 and 14 are mounted so as to be contiguous with the conveyor rails 22 and 24 so as to blend smoothly therewith.

Figure 4:
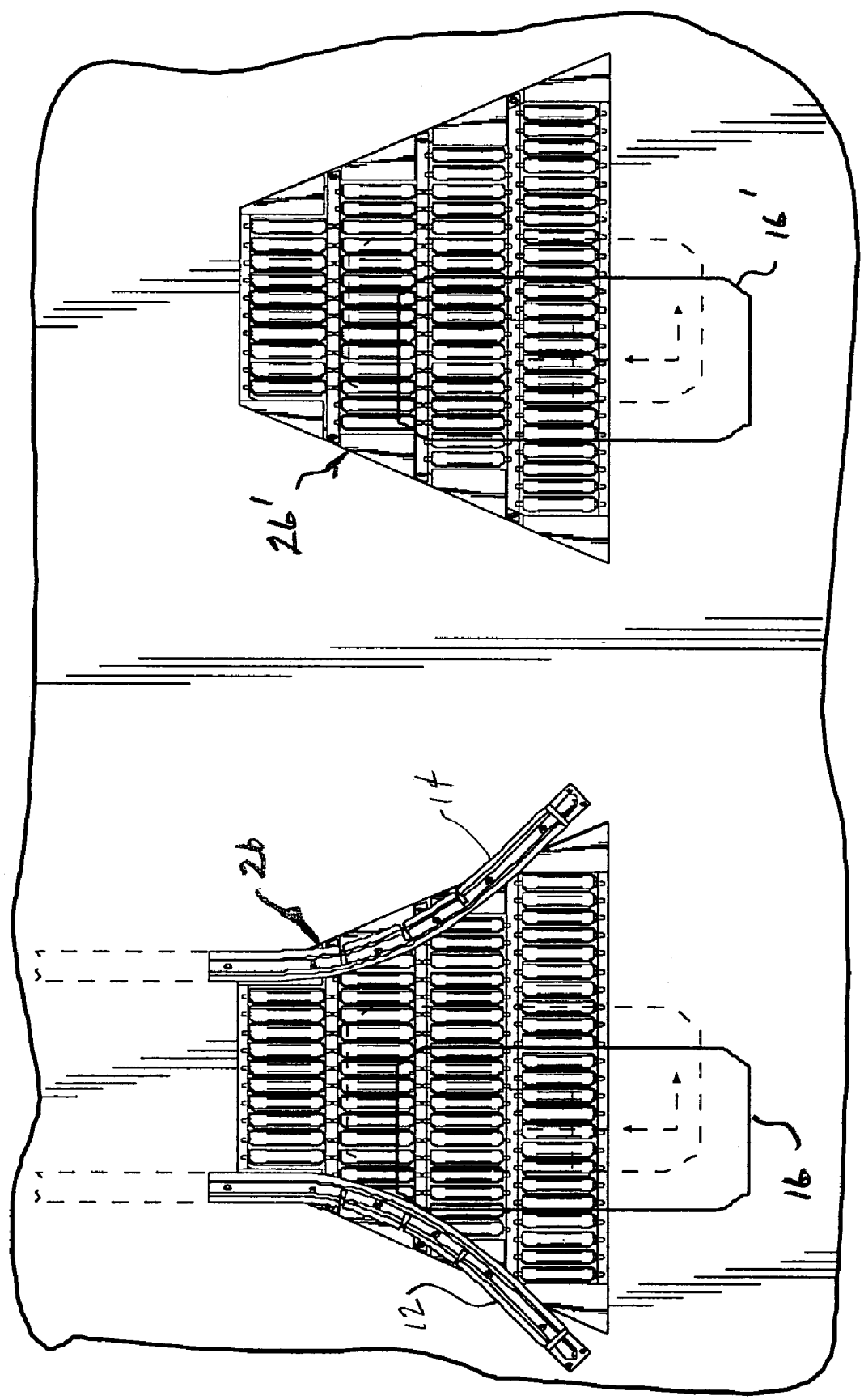
FIG. 4 is a plan view showing two roller grids, one of which is associated with the curved entry rails of the present invention.
Figure 5:
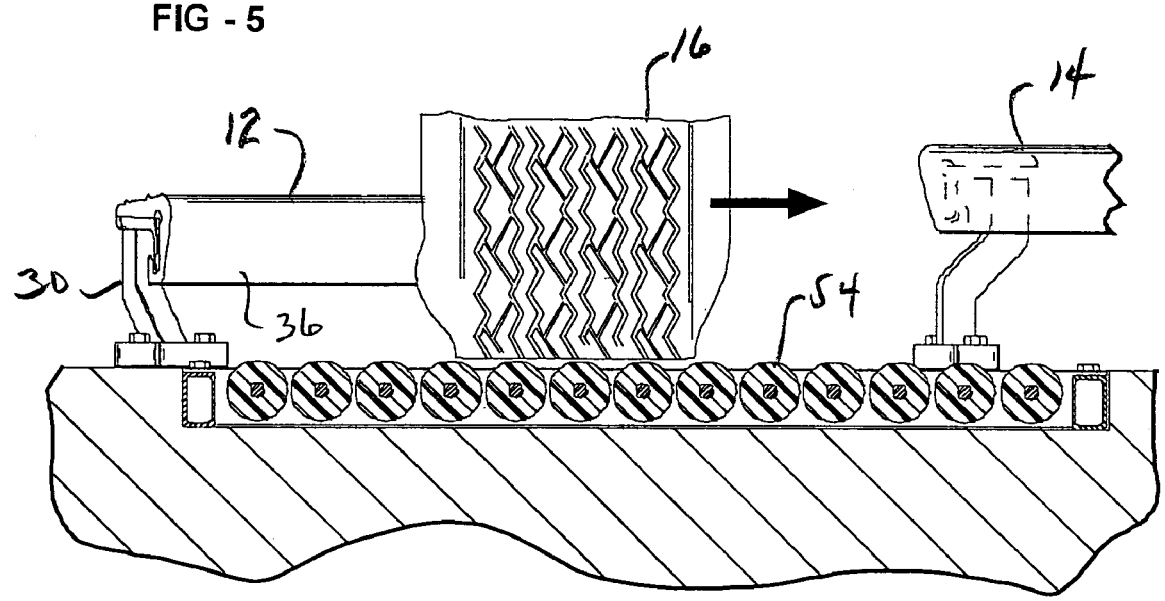
FIG. 5 is an end view of a tire entering the entry section off-line to the left.

The entry rails 12 and 14 are preferably, but not necessarily, used in combination with roller grids 26 and 26' to accommodate the front left tire 16 and front right tire 16' of the vehicle 18 as best shown in FIG. 4. The roller grids each comprise a trapezoidal frame 46, cross-pieces 48, 50 and 52, rollers 54 and cover plates 56. The two roller grids 26 and 26' are mounted in the floor of the car wash and spaced apart by approximately the width of a standard automobile tread. The roller grids permit lateral shifting of the front and/or rear of the automobile which attempts to enter the car wash conveyor lane off-line. Various equivalent devices are available.

It is to be understood that the invention has been described with reference to a specific and preferred embodiment thereof and the various modifications and additions may be made to this illustrative embodiment without departing from the spirit and scope of the invention as defined by the following claim.

What is claimed is:

1. A vehicle tire entry guide for transitioning vehicles into a car wash conveyor lane comprising:
    a pair of reversely similar tire guide rails made of angle iron having an L-sbaped cross section;
    each of said reversely similar tire guide rails being smoothly curved over at least a portion thereof;
    means for mounting said guide rails on a tire travel surface to define a gradually narrowing tire guide path into said lane; and
    an extruded elastomeric cover confirmingly fitted over the inside and top surfaces of at least the curved portion of each of said guide rails.

2. A vehicle tire entry guide as defined in claim 1, wherein said cover is a plastic extrusion having one or more relief slots formed therein to permit the extrusion to be curved.

3. A vehicle tire entry guide as defined in claim 2, wherein the rails are metal, further including a fastener means for securing the plastic extrusion to the metal rail.

4. A vehicle tire entry guide as defined in claim 1, wherein the rail is L-shaped, with horizontal and vertical portions, and the extruded cover fits snugly and conformingly over the L-shape and has a lower portion which is reversely curved to extend around the lower end of the vertical portion.

5. A vehicle tire entry guide as defined in claim 1, further including a straight conveyor rail mounted contiguous with each of the ends of the reversely similar tire guide rails which are most closely spaced together.

6. A vehicle tire entry guide as defined in claim 5 wherein one of the reversely similar rails is taller than the other.

7. A vehicle tire entry guide as defined in claim 1 further including an array of rollers located between the curved guide rail portions and defining said tire travel surface; said rollers having parallel, longitudinal axes of rotation to facilitate low force lateral movement of a vehicle between said guide rails.

* * * * *